(12) United States Patent
McKedy

(10) Patent No.: US 6,436,872 B2
(45) Date of Patent: *Aug. 20, 2002

(54) OXYGEN ABSORBER

(75) Inventor: George E. McKedy, Williamsville, NY (US)

(73) Assignee: Multisorb Technologies, Inc., Buffalo, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/847,832

(22) Filed: May 2, 2001

Related U.S. Application Data

(63) Continuation of application No. 08/328,081, filed on Oct. 27, 1994, now Pat. No. 6,248,690, which is a continuation-in-part of application No. 08/150,617, filed on Nov. 10, 1993, now abandoned, which is a continuation-in-part of application No. 07/888,966, filed on May 26, 1992, now Pat. No. 5,262,375.

(51) Int. Cl.$^7$ .............................................. B01J 20/04
(52) U.S. Cl. .................... 502/406; 502/404; 502/405; 502/416; 502/417; 502/402; 252/188.28; 95/138; 423/219
(58) Field of Search ................................ 502/402, 405, 502/406, 416; 252/188.28; 95/138; 423/219

(56) References Cited

U.S. PATENT DOCUMENTS

| | | | |
|---|---|---|---|
| 4,127,503 A | 11/1978 | Yoshikawa et al. | |
| 4,166,807 A | 9/1979 | Komatsu et al. | |
| 4,192,773 A | 3/1980 | Yoshikawa et al. | |
| 4,230,595 A | 10/1980 | Yamaji et al. | |
| 4,299,719 A | 11/1981 | Aoki et al. | |
| 4,366,179 A | 12/1982 | Nawata et al. | |
| 4,406,813 A | 9/1983 | Fujishima et al. | |
| 4,769,175 A | 9/1988 | Inoue | |
| 4,992,410 A | * 2/1991 | Cullen et al. | 502/407 |
| 4,996,068 A | 2/1991 | Hatakeyama et al. | |
| 5,124,164 A | 6/1992 | Matsumoto et al. | |
| 5,151,262 A | 9/1992 | Pemsler et al. | |
| 5,207,943 A | 5/1993 | Cullen et al. | |
| 5,262,375 A | 11/1993 | McKedy | |
| 6,248,690 B1 | * 6/2001 | McKedy | 502/406 |

FOREIGN PATENT DOCUMENTS

DE      2754708      6/1978

* cited by examiner

Primary Examiner—Elizabeth D. Wood
(74) Attorney, Agent, or Firm—Joseph P. Gastel

(57) ABSTRACT

An oxygen-absorbing composition containing particulate annealed electrolytically reduced iron of between about 100 mesh and 325 mesh in an amount of about up to 63% by weight, a salt such as sodium chloride in an amount by weight of about up to 3.5%, and a water-supplying component comprising activated carbon. with liquid water therein of a mesh size of between about 20 mesh and 50 mesh in an amount by weight of up to about 85% in an envelope which will resist the passage of liquid water out of the envelope but will permit flow of oxygen into the envelope at a satisfactory rate.

12 Claims, 3 Drawing Sheets

Fig. 4.
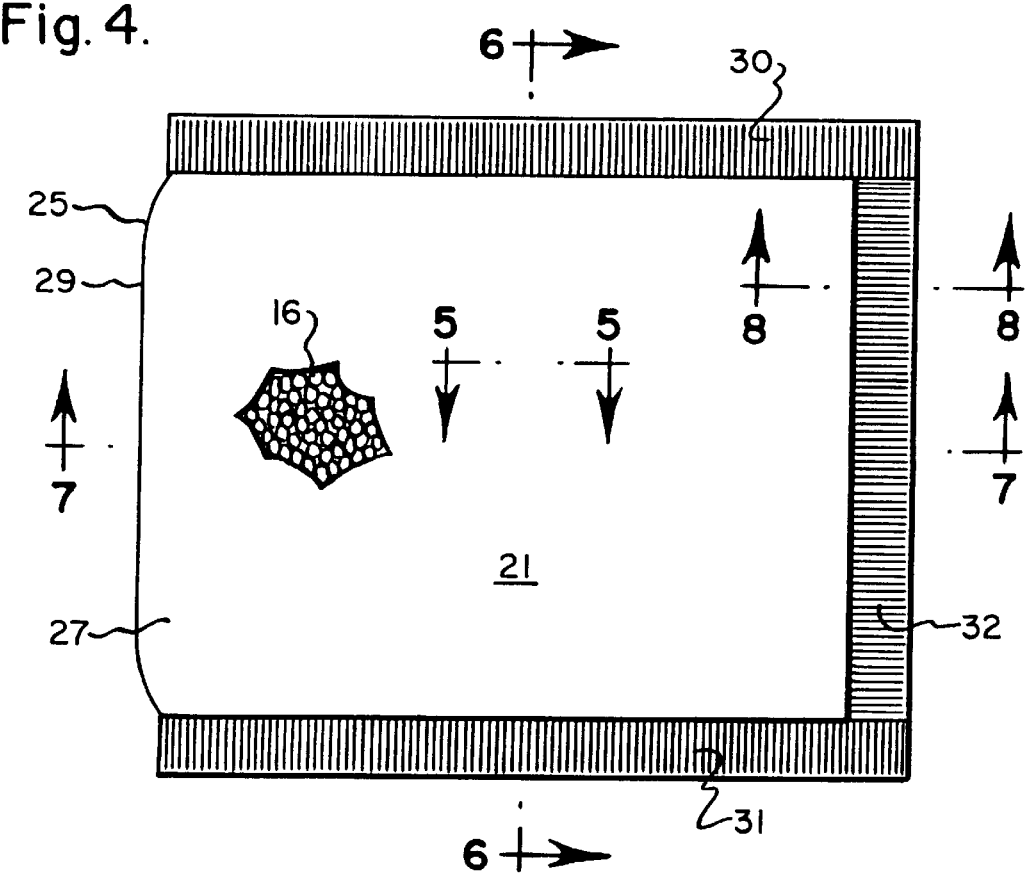
Fig. 6.
Fig. 7.
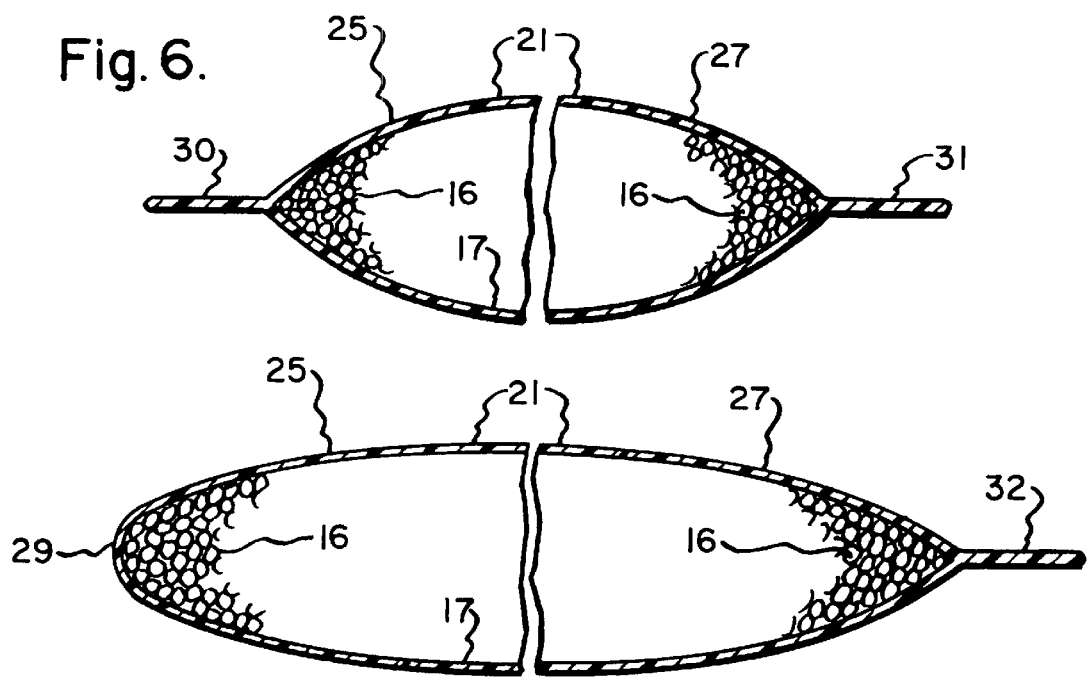

OXYGEN ABSORBER

CROSS REFERENCE TO RELATED APPLICATION

This Application is a continuation of Ser. No. 08/328,081, filed Oct. 27, 1994, now U.S. Pat. No. 6,248,690, which is a continuation-in-part of application Ser. No. 08/150,617, filed Nov. 10, 1993, and now abandoned which is a continuation-in-part of application Ser. No. 07/888,966, filed May 26, 1992, now U.S. Pat. No. 5,262,375.

BACKGROUND OF THE INVENTION

The present invention relates to an improved oxygen absorber for absorbing oxygen primarily in ambient temperature dry environments and which will also function satisfactorily in in both low temperature environments and in moist environments.

By way of background, particulate iron is known as an oxygen absorber because it readily combines with oxygen. In the past, various types of particulate iron have been used, including hydrogen reduced iron, electrolytically reduced iron, atomized iron, and milled pulverized iron. However, the hydrogen reduced iron, the atomized iron and the milled pulverized iron absorb oxygen relatively slowly. The electrolytically reduced iron absorbs oxygen faster, but at lower temperatures at which foods are normally refrigerated it absorbs oxygen at a slower rate than desired to remove the oxygen before the initial stages of food spoilage commence. Furthermore, in dry environments it is necessary to supply moisture for producing an electrolytic action which is necessary for activating the oxygen-absorbing action of the iron. However, silica gel which has been used in the past for adsorbing moisture from a moist environment cannot be used for a plurality of reasons. The first reason is that if it contains sufficient moisture to supply such moisture, it is not flowable and thus cannot be used efficiently in a manufacturing process. The second reason is that if it contains a lesser amount of moisture so that it remains flowable, it will not give this moisture up for combining with a salt to produce an electrolyte, and further, in a dry environment it will not have a source of moisture from which it can adsorb the necessary moisture for activating oxygen absorption. Furthermore, the envelopes of certain prior oxygen-absorbing packets were deficient for use in dry environments in that they permitted moisture to escape from a moisture-containing oxygen-absorbing composition which diminished the moisture available for producing the required electrolytic action.

SUMMARY OF THE INVENTION

It is the primary object of the present invention to provide an improved oxygen-absorbing composition which can supply moisture in dry environments for the purpose of enhancing oxygen absorption.

Another object of the present invention is to provide an improved oxygen absorber which is flowable and which contains activated carbon with a relatively high percentage of water impregnated therein which is required to supply moisture for absorbing oxygen in dry environments, the flowability being required for efficient handling in the manufacturing process.

A further object of the present invention is to provide an improved oxygen-absorbing composition which includes particulate annealed electrolytically reduced iron and moisture-impregnated activated carbon which will provide good oxygen absorption in dry environments, in moist environments and in low temperature environments.

Yet another object of the present invention is to provide an improved combination of a package and an oxygen-absorbing composition which will provide good oxygen absorption in dry environments.

A still further object of the present invention is to provide an improved combination of a package and an oxygen-absorbing composition which inhibits migration of water from a moisture-carrying product in the package and thus conserves available moisture for creating an electrolyte for combining with iron to effect oxygen-absorption in dry environments. Other objects and attendant advantages of the present invention will readily be perceived hereafter.

The present invention relates to an oxygen-absorbing composition comprising in relatively sufficient proportions particulate annealed electrolytically reduced iron, salt for combining with water to produce an electrolyte which combines with said iron to cause it to absorb oxygen, and a water-supplying component comprising activated carbon with liquid water therein for supplying said water to said salt to produce said electrolyte.

The present invention also relates to an oxygen-absorbing packet for absorbing oxygen in dry environments comprising the above composition in an envelope consisting of a laminate of ethylene vinyl acetate, water and grease resistant paper, and microperforated polyester film.

The various aspects of the present invention will be more fully understood when the following portions of the specification are read in conjunction with the accompanying drawings wherein:

BRIEF DESCRIPTION OF THE DRAWINGS

FIG. 4 is a plan view of a packet which utilizes a preferred material for the envelope;

FIG. 6 is a fragmentary cross sectional view taken substantially along line 6—6 of FIG. 4;

FIG. 7 is a fragmentary cross sectional view taken substantially along line 7—7 of FIG. 4.

DESCRIPTION OF THE PREFERRED EMBODIMENTS

The improved oxygen absorber, in various forms, is intended for use with various types of food products and other products packaged in dry environments, packaged in moist environments, and also products which require refrigeration at temperatures below the ambient temperature and generally at temperatures below about 50° F. and more specifically below about 40° F. The improved oxygen absorber comprising annealed electrolytically reduced iron is more efficient at both low temperatures and normal ambient temperatures than conventional oxygen absorbers, such as particulate electrolytically reduced iron which has not been annealed. In this respect, it is believed that the annealing changes the structure of the electrolytically reduced iron by inceasing the surface area which, in turn, causes it to be more active in its oxygen-absorbing capacity.

The improved oxygen absorber composition of the present invention in its most basic form comprises particulate annealed electrolytically reduced iron plus a salt which combines with moisture obtained from moisture-impregnated activated carbon to produce an electrolyte for activating the iron to absorb oxygen. This composition is desired for use in dry environments. The improved oxygen-absorber composition is preferably packaged in an envelope, described hereafter, which inhibits migration of moisture out of the envelope, thereby conserving such moisture for the oxygen-absorbing reaction.

Figure 1:
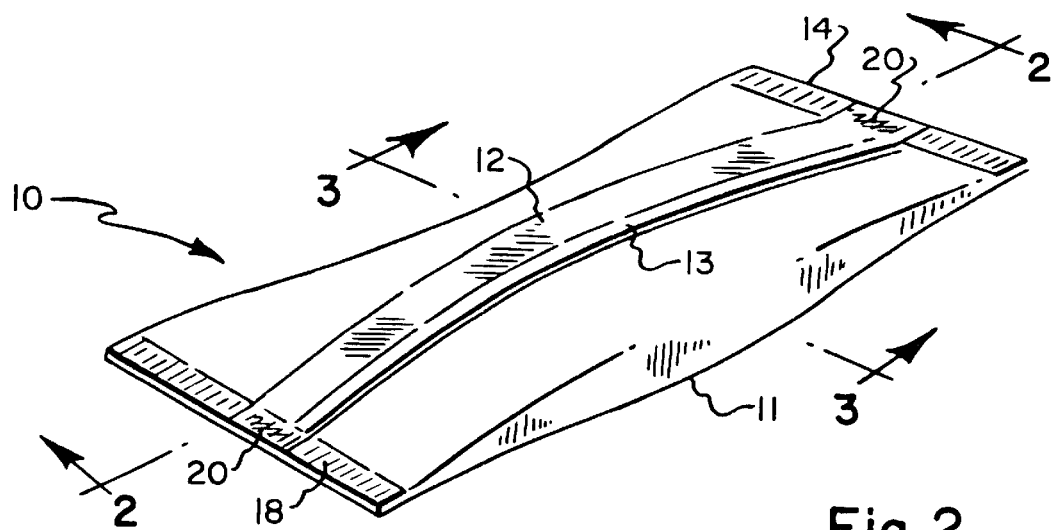
FIG. 1 is a perspective view of an oxygen-absorbing packet of the present invention.
Figure 2:
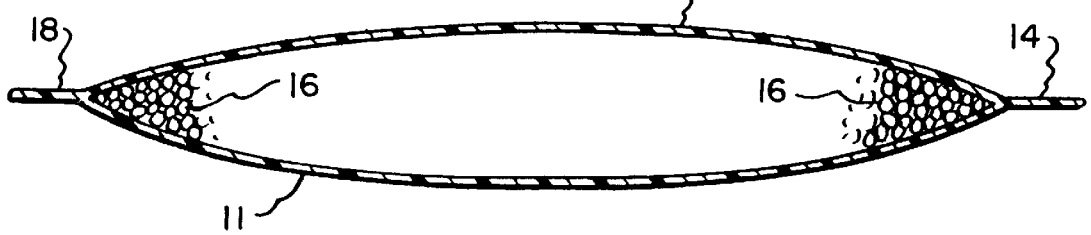
FIG. 2 is a cross sectional view taken substantially along line 2—2 of FIG. 1.
Figure 3:
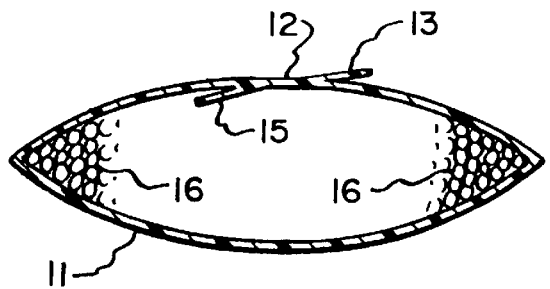
FIG. 3 is a cross sectional view taken substantially along line 3—3 of FIG. 1.

One embodiment of a packet 10 which comprises the improved oxygen absorber is shown in FIGS. 1–3. The packet 10 of this embodiment includes an envelope 11 of spun-bonded polyolefin which is known under the trademark TYVEK, and this envelope is used primarily in moist environments with or without silica gel as part of the oxygen-absorbing composition. In a moist environment the silica gel adsorbs moisture from the moist environment and supplies it to the remainder of the oxygen absorbing composition, as discussed in greater detail hereafter. Envelope 10 is formed by folding flexible planar material into tubular form and fusing it along overlapping edge portions 13 and 15 to provide a seam 12. The end portion is then fused at 14, as by heat and pressure, and the envelope is then filled with oxygen-absorbing material described hereafter. Thereafter, the other end portion is fused at 18, as by heat and pressure to close the envelope. The ends of seam 12 are secured to end portion 18 at 20. This envelope structure is generally described in U.S. Pat. No. 4,992,410, which is incorporated herein by reference. However, it will be appreciated that other suitable envelope constructions may be use, and a preferred envelope material, which is to be used in dry environments for an oxygen-absorbing composition containing water-impregnated activated carbon is described at an appropriate point hereafter.

The particulate annealed electrolytically reduced iron which is used in the oxygen-absorbing composition 16 can be of a size of between about 50 mesh and 325 mesh and more preferably between about 100 mesh and 325 mesh and most preferably about 200 mesh. It has been found that the larger the mesh size, the slower will be the reaction. Thus, 100 mesh will react more slowly than 200 mesh which will react more slowly than 325 mesh. However, the 325 mesh size is difficult to handle with certain packaging machinery. Particulate annealed electrolytically reduced iron of various sizes which have been used are manufactured by the SCM Corporation under the designations A-210 (100 mesh), A-220 (200 mesh) and A-230 (325 mesh).

Another component of the oxygen-absorbing composition is a salt which, when combining with water, will form an electrolyte to activate the particulate iron. The salt is preferably sodium chloride which may be present by weight in an amount of between about 0.4% to 3.5% and preferably between about 1.0% and 2.0%. The salt should be present in an amount so that it is sufficiently concentrated relative to the iron so that all portions of the iron are in contact with the electrolyte which is formed by the salt. Above 3.5% no increase in reaction rate occurs. The exact amount of sodium chloride is not critical. The salt can be between about 48 mesh and 325 mesh. It will be appreciated that if an excessive amount of iron is used for a particular environment, the amount of salt could be less than 0.4% by weight, and thus there will be oxygen absorption at a good rate, but the system will be inefficient. Therefore, it will be appreciated that the only requirement, if efficiency is not a factor to be considered, is that the particulate annealed electrolytically reduced iron and the salt should be present in sufficiently relative proportions to absorb oxygen at a desired rate.

Other equivalent salts may be substituted for the sodium choride, and these include, without limitation, calcium chloride, potassium chloride, magnesium sulfate, magnesium chloride, barium chloride, potassium nitrate, potassium phosphate, potassium hypophosphate, sodium carbonate and potassium carbonate. However, sodium chloride, potassium iodide, potassium bromide, calcium chloride and magnesium chloride are preferred.

The composition of particulate annealed electrolytically reduced iron and salt, without more, provides effective oxygen absorption in atmospheres or containers wherein there is sufficient moisture to combine with the salt to produce an electrolyte. However, in environments wherein there is moisture present but the amount of moisture is relatively low, that is, where the amount of moisture is less than that which will activate the electrolyte without the use of an agent to attract moisture, a water-attracting and supplying component can be added to the particulate annealed electrolytically reduced iron and salt. The water-attracting and supplying component can be a silica gel which has a water-attracting and supplying capacity. The silica gel may be present by weight in any amount up to about 80% and more preferably between about 40% and 50%. The water content of the silica gel by weight can vary from 0% to 32% and more preferably between about 18% and 26%.

When the water-attracting and supplying component is used, the salt can be added to both the silica gel and to the iron prior to combining them. The salt can be added to the silica gel by dissolving it in water before being added to the silica gel. The silica gel can have a mesh size of between about 30 mesh and 325 mesh. However, the mesh size is not critical. Other water-attracting and supplying components may be used and these include without limitation diatomaceous earth, perlite, zeolite, activated carbon, sand, salt, activated clay, molecular sieve, cellulose, acrylic polymers or other natural and synthetic polymers.

Of the above water-attracting and supplying components, it has been found that activated carbon with liquid water impregnated therein is superior to silica gel for operation in dry environments which cannot supply sufficient moisture for combining with the electrolyte to activate the oxygen absorbing capability of the iron. The water-impregnated activated carbon is primarily a moisture supplier in the sense that it readily gives up its impregnated water in dry environments whereas silica gel must generally first adsorb moisture from the environment before it gives it up, especially when the amount of moisture it contains is less than its saturated amount. Thus in very dry environments, the silica gel cannot effectively adsorb and supply moisture because there is insufficient moisture for it to adsorb and thereafter release. The dry environments are those which do not have moisture, such as canned or packaged products of various types including but not limited to nuts, fried foods, potato chips, cereals, grains, pharmaceuticals, powders and other materials which are subject to deterioration by oxygen but which cannot supply the moisture for combining with the salt to produce an electrolyte. The activated carbon is especially advantageous (1) because it can have added to it a relatively large amount of water before it is placed in the dry environment which it will thereafter readily release after having been placed in the dry environment, and (2) because of its flowability as a powder after it has relatively large amounts of water added thereto and adsorbed therein, and is thus desirable from a manufacturing viewpoint because it flows well into the envelopes both by itself and when in a mixture with the particulate iron. This is in contrast to silica gel which becomes a slurry when it has more than 26% by weight of the combined silica gel and moisture, and as such is not flowable. The flowable activated carbon will not only carry the liquid water but it will readily give it up to the salt for forming the electrolyte. This is in contrast to silica gel discussed above because the silica gel is both a water-attracting and supplying material. In this respect, the silica gel will attract water from its environment until it becomes saturated and after it becomes saturated, it will continue to attract water until it becomes supersaturated and then it will release the water to the environment. However, if there is no water in the environment originally, the silica gel will be incapable of supplying liquid water to the electrolyte because there is insufficient water in the dry environment to be attracted by the silica gel before it can be released.

The moisture-impregnated activated carbon, that is, the activated carbon plus its moisture, may be present in an amount of between 37% and 85% by weight of the total weight of the oxygen-absorbing composition and more preferably between 59% and 78% and most preferably between 64% and 75%. Thus, the annealed electrolytically reduced iron can be present by weight in an amount of between about 15% and 63%, and more preferably between about 22% and 41%, and most preferably between about 25% and 36%, and the salt can be present as noted above in an amount by weight of the iron of between about 0.4% and 3.5%. The exact amount is not critical, and exceeding 3.5% will not hasten the reaction. The preferred size of the activated carbon is about 20×50 mesh. However, it can range between about 100 mesh to between about 4×6 mesh and it can be as small as about 200 mesh. Also, the activity test number may be between about 30 and 90 weight percent adsorption, and more preferably between about 40 and 80 weight percent adsorption and most preferably between about 50 and 60 weight percent adsorption; the surface area may be between about 400 and 2000 sq. m/gm, and more preferably between about 600 and 1500 sq. m/gm and most preferably between about 900 and 1000 sq. m/gm; the pore volume may be between about 0.3 and 1.3 cc/gm, and more preferably between about 0.5 and 1.0 cc/gm, and most preferably between about 0.7 and 0.8 cc/gm; and the density may be between about 19 and 35 lbs/cubic foot dry and 35 and 50 lbs/cubic foot wet, and more preferably between about 25 and 34 lbs/cubic foot dry and 40 and 50 lbs/cubic foot wet, and most preferably between about 30 and 32 lbs/cubic foot dry and 45–50 lbs/cubic foot wet.

A preferred activated carbon which has been used in all of the examples set forth hereafter has the following characteristics. It has a size of 20×50 mesh; an activity of 50 to 60 weight percent adsorption; a surface area of 900–1000 sq. m/gm; moisture in the amount of 31–34% by weight; a pore volume of 0.7 to 0.8 cc/gm; and a density of 30 to 32 lbs/ft$^3$ dry and 45 to 50 lbs/ft$^3$ wet.

As noted above, water is added to the activated carbon by merely mixing it therewith. The water may be present by weight as a percent of the combined weight of the activated carbon and water between 10% and 40% and more preferably between 20% and 38% and most preferably between 31% and 35%. With all of the above percentages, the activated carbon remains flowable as a powder, whereas when silica gel has more than 26% by weight of moisture, it becomes a slurry.

The improved composition containing annealed electrolytically reduced iron, salt and activated carbon impregnated with liquid water can be prepared in the following manner. The required amount of salt, such as sodium chloride, is dissolved in the required amount of water which is thereafter mixed into the activated carbon. Thereafter, the activated carbon with the salt water electrolyte therein is mixed or blended with the annealed electrolytically reduced iron and the resulting composition is placed into the envelope in which it is used. As noted above, this mixture flows well. Alternatively, the mixture of activated carbon with salt solution therein and the annealed electrolytically reduced iron can each be deposited separately into the envelope. As a further alternative, and preferably, the required amount of dry salt can be mixed with the annealed electrolytically reduced iron, and the required amount of water can be mixed or blended with the activated carbon, and thereafter each mixture can be independently deposited into the envelope, or the two mixtures can be mixed with each other and thereafter deposited into the envelope.

A preferred formulation for absorbing 100 cc of oxygen consists of 200 mesh annealed electrolytic iron in the amount of 0.85 grams and the above-described preferred impregnated activated carbon in the amount of 2.0 grams with the impregnated activated carbon consisting by weight of 65.5% of activated carbon, 33% of water and 1.5% of sodium chloride. This 2.85 gram mixture comprises 30% by weight of iron and 70% by weight of impregnated activated carbon.

The improved oxygen absorber containing moisture-impregnated activated carbon for use in dry environments is packaged in a moisture and oxygen permeable envelope which will permit oxygen to pass therethrough but will resist the migration of the water therefrom so that such water is confined to combining with the salt rather than being drawn away into the dry environment, which essentially produces a desiccating action. The envelope containing the oxygen-absorbing composition comprises a packet which is placed in various types of containers including bags, cans and jars which contain materials in a dry environment.

Figure 5:
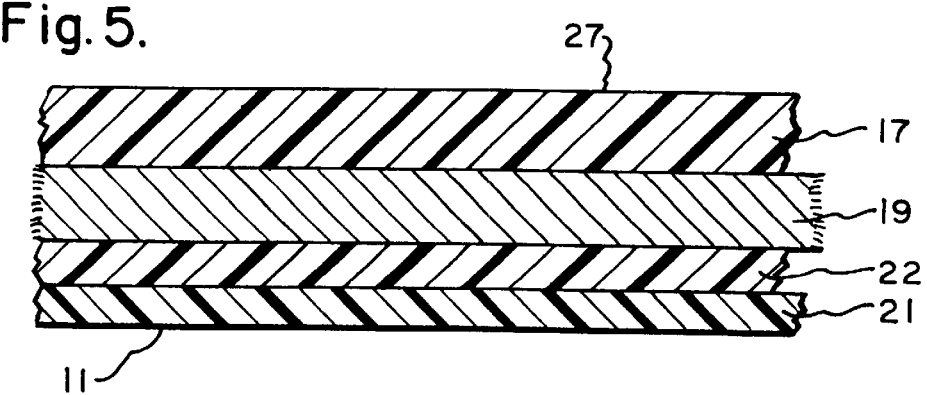
FIG. 5 is an enlarged cross sectional view taken substantially along line 5—5 of FIG. 4 and showing the material which is utilized to form the envelope of the oxygen-absorbing packet.
Figure 8:
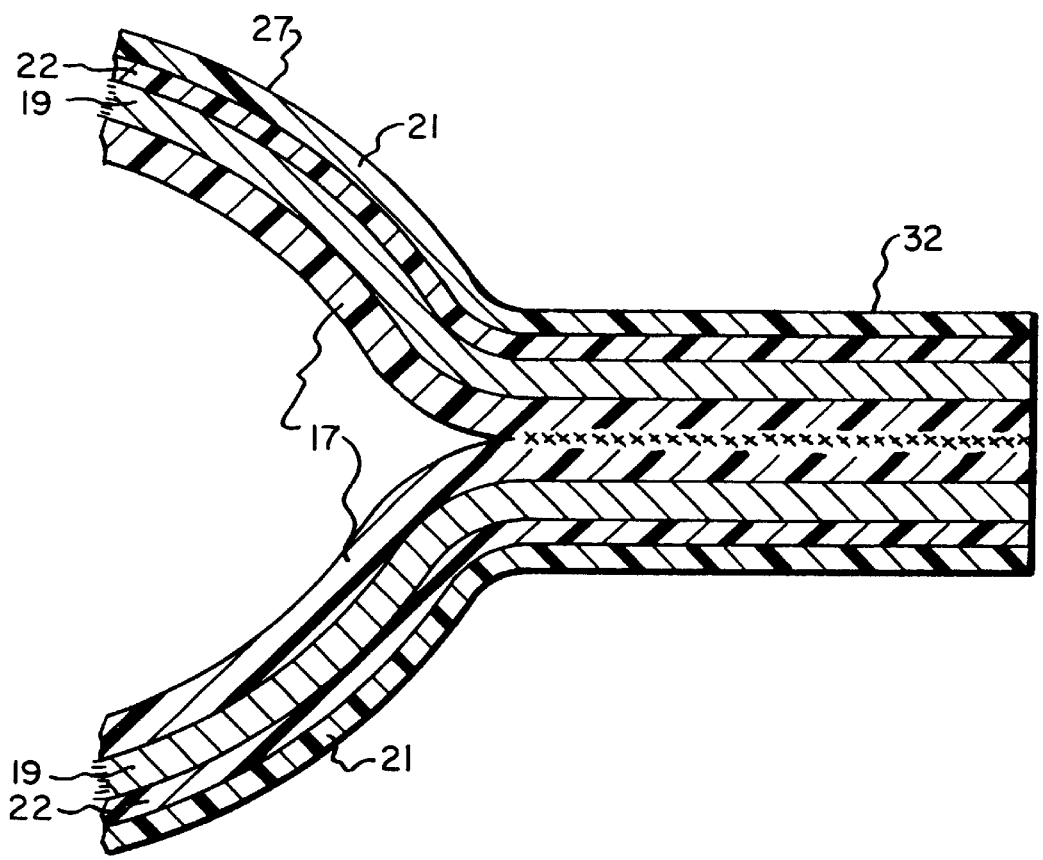
FIG. 8 is a fragmentary cross sectional view taken substantially along line 8—8 of FIG. 4 and showing the structure of the seams.

The preferred material from which an envelope 25 is fabricated is shown in FIG. 5 and an envelope fabricated therefrom is shown in FIG. 4. The material is a laminate 27 consisting of an inner layer 17 of EVA (ethylene vinyl acetate) 30 microns thick which has 250,000 holes per square meter; a layer of water and grease resistant paper 19 having a weight of 50 grams per square meter; a layer 22 of low density polyethylene 15 microns thick; and an outer layer 21 of microperforated polyester film 12 microns thick having 13,888 holes per square meter. It will be appreciated that the foregoing dimensions may vary. Layer 19 of water and grease resistant paper limits migration of material into and out of the envelope 11 and prevents staining thereof from food on the outside and rust from oxidation of the iron inside the envelope 11. Layer 22 of low density polyethylene is a seal layer to seal layers 19 and 21 to each other, and thus the low density polyethylene layer is not considered part of the functioning laminate other than as a seal. Inner layer 17 is sealed to paper layer 19. The perforated polyester outer layer 21 is the material which contacts food or other substances within a container into which packet 10 is placed. The layers 17, 19, 22 and 21 are sealed into the laminate 27 by suitable heat and pressure. The water vapor transmission rate of the laminate 27 is 50–75 grams per square meter per 24 hours. This is in contrast to the TYVEK which is used in moist environments and which has a much greater vapor transmission rate. The laminate 27 is essentially a trilaminate of the EVA inner layer 17, the water and grease resistant paper 19, and the outer polyester layer 21, and in the various examples presented hereafter it is referred to as a trilaminate. This trilaminate is a commercially available product known as San-ai TJ-2802.

The foregoing laminate is especially desirable for the intended purpose of limiting or impeding migration of water out of the envelope. The envelope will tend to retain the water therein while permitting oxygen to pass therethrough. Thus, the envelope will resist loss of water from the moisture-impregnated activated carbon during the packaging process and during short periods of storage so that it will be present for combining with the salt to produce an electrolyte after it is placed in a dry environment.

The envelope 25 which is fabricated from laminate 27 is shown in FIGS. 4, 6 and 7. The envelope 25 is fabricated from a folded-over piece of material 27 at fold 29, and the inner layer 17 is sealed to itself by heat and pressure to form seams 30, 31 and 32. The oxygen-absorbing composition 16 is placed within envelope 25 prior to sealing the last of seams 30, 31 or 32.

The oxygen absorber composition utilizing annealed electrolytically reduced iron can be made into a label utilizing any of the foregoing envelope materials which can be adhesively secured to the inside of a wrapper or a container. The oxygen absorber will thus absorb oxygen from any air which is trapped within the package or container after it has been hermetically sealed, and it will also attract oxygen which may originally exist within the product itself which is within the package.

The oxygen absorber containing moisture-impregnated activated carbon is intended to be used with all types of dry packaged products which may be deleteriously affected by the presence of oxygen, and it can also be used in moist environments. These products especially comprise dry foods, such as pasta, nuts, dried foods, prepared cereals, grains, pharmaceuticals and other dry substances, and the products also include, without limitation, non-dry foods such as meat, fish or anything else which will be affected in taste or quality by the presence of oxygen.

As noted above, the improved oxygen absorber which includes particulate annealed electrolytically reduced iron is especially beneficial at refrigerated temperatures, that is, all temperatures below about 50° F. and more preferably between about 32° F. and 40° F. It is also beneficial as low as 28° F., and it is believed to be beneficial at temperatures below 28° F. Stated more broadly, the improved oxygen absorber containing annealed electrolytically reduced iron is intended for use especially at any refrigerated temperature which is below the normal ambient temperature. As noted above, the oxygen absorber containing the particulate annealed electrolytically reduced iron is also more effective at ambient temperatures than such a product which has not been annealed or other types of particulate iron which have heretofore been used for oxygen absorption.

Various compositions have been formulated utilizing particulate annealed electrolytically reduced iron. The following Examples 1–3 show the oxygen-absorbing capability of the annealed electrolytically reduced iron in compositions which are used in moist environments and which do not include activated carbon with liquid water therein and which are packaged in TYVEK (spun bonded polyolefin) envelopes and contain silica gel. In the moist environments the silica gel attracts water to the composition for activating oxygen absorption. In moist environments the TYVEK envelope is desired over the trilaminate envelope because it has a higher water vapor transmission rate and thus can permit the silica agel to relatively rapidly receive its moisture from the moist environment.

EXAMPLE 1

A composition was prepared by mixing 0.5 grams of 200 mesh annealed electrolytically reduced iron with 0.5 grams of 100 mesh annealed electrolytically reduced iron. Both types of iron were previously blended with 2% by weight of sodium chloride having a particle size of about 325 mesh. The foregoing composition was sealed in a TYVEK envelope which was placed in a 1000 cc sealed glass jar containing atmospheric air having about 20.6% oxygen. The jar also contained a piece of blotter paper containing about one gram of water to provide moisture. The jar was placed in a refrigerator having a temperature of 39° F. With the foregoing blend, 59 cc of oxygen were absorbed in 24 hours, and 156 cc of oxygen were absorbed in 48 hours.

EXAMPLE 2

The same formulation as set forth in Example 1 was placed in a 2-gallon plastic air-tight container having 7500 cc of atmospheric air containing about 20.6% of oxygen, or 1559 cc of oxygen. A piece of blotter paper containing four grams of water was also placed in the container. The container was sealed and placed in a 39° F. refrigerator. The theoretical capacity of the formulation containing one gram of iron is 295 cc of oxygen. At refrigerated conditions of 39° F., the above formulation absorbed 20% of its theoretical capacity of 295 cc of oxygen, or 59 cc, in 24 hours and a total of 53%, or 156 cc, theoretical capacity of 295 cc in 48 hours.

EXAMPLE 3

A mixture was provided in a TYVEK packet containing 0.5 grams of 200 mesh annealed electrolytically reduced iron, 0.5 grams of 100 mesh annealed electrolytically reduced iron, and 0.8 grams hydrated silica gel containing 21% moisture. The composition also contained 1.5% by weight of sodium chloride having a mesh size of 325. The hydrated silica gel had a mesh size of between 30 and 200. The above formulation was placed in a TYVEK envelope, and the sealed envelope was inserted into a 1000 cc glass jar containing atmospheric air containing about 206 cc of oxygen which was then sealed and placed in a refrigerator having a temperature of 39° F. The foregoing formulation absorbed 35% of its theoretical capacity of 295 cc of oxygen in 24 hours, and it absorbed 58% of its theoretical capacity of 295 cc of oxygen in 48 hours. Thus, it absorbed 103 cc of oxygen in 24 hours and 171 cc in 48 hours. It can thus be seen that Example 3 which contains the hydrated silica gel is much faster acting in the first 24 hours than the composition of Example 1 which contains the same amounts of 100 mesh and 200 mesh iron but does not contain the silica gel.

Comparisons were made of the oxygen-absorbing characteristics of like compositions of both annealed electrolytically reduced iron and non-annealed electrolytically reduced iron, and it was found that the former absorbed oxygen at a much faster rate. More specifically, two compositions were made. Composition A contained 0.85 grams of 200 mesh annealed electrolytically reduced iron and 1.36 grams of silica gel containing 23% water and 1.5% sodium chloride. Composition B had the same ingredients, except that the iron was electrolytically reduced, but not annealed. Each composition, after blending, was placed in a TYVEK envelope and each was then placed in a separate air-tight glass container having about 500 cc of atmospheric air which included about 100 cc of oxygen. The containers each also had a piece of blotter paper placed therein containing one gram of water. Each container was then placed in a 38° F. refrigerator. The following rates of oxygen absorption were observed:

| AMOUNTS OF OXYGEN ABSORBED IN CC | | |
|---|---|---|
| Elapsed time in hours | Composition A (Annealed) | Composition B (Non-annealed) |
| 19 | 91 | 29 |
| 25 | 100 | 60 |
| 28 | — | 71 |
| 42 | — | 100 |

It was also found that the reaction temperatures utilizing annealed electrolytically reduced iron at ambient temperatures was much faster than the use of electrolytically reduced iron which was not annealed.

Tests were made of the rate of oxygen absorption of a mixture containing annealed electrolytically reduced iron at room temperature of about 72° F. A mixture containing 0.85 grams of A-220 annealed electrolytically reduced iron of 200 mesh with 1.36 grams of silica gel containing 26% water and 1.5% sodium chloride was placed in a TYVEK envelope which was sealed. The packet consisting of the sealed envelope and its contents was placed in a 500 cc glass jar containing a gram of water on blotter paper. The jar contained 500 cc of atmospheric air containing about 100 cc of oxygen. Three jars were tested with one packet in each jar, and the average of three tests showed that after 2 hours 19 cc of oxygen were absorbed, after 4 hours 73 cc were absorbed, and at 6 hours 100 cc were absorbed. Tests were also made under substantially identical conditions with the only change being the use of non-annealed reduced iron. As a result of such tests, it was found that after 2 hours 7 cc of oxygen was absorbed, after 4 hours 10 cc was absorbed, after 7 hours 29 cc was absorbed and after 24 hours 100 cc was absorbed. The above data is set forth in the following table for ease of comparison:

| COMPARISON OF OXYGEN ABSORPTION RATES IN CC | | | | |
|---|---|---|---|---|
| | Time in Hours | | | |
| Composition | 2 | 4 | 6 | 7 |
| A | 19 | 73 | 100 | — |
| B | 7 | 10 | — | 29 | where A is annealed electrolytically reduced iron and B is non-annealed electrolytically reduced iron.

The following Examples 4–7 are directed to the use of water-impregnated activated carbon in dry environments and show the differences in results which were obtained by using TYVEK envelopes versus trilaminate envelopes. The results of the TYVEK envelopes are set forth in Examples 4 and 6, and the results of the trilaminate envelopes are set forth in Examples 5 and 7. Example 4 is to be compared with Example 5 and Example 6 is to be compared with Example 7.

EXAMPLE 4

A composition was prepared by blending 0.34 grams of 100 mesh annealed electrolytically reduced iron with water-impregnated activated carbon of the above-described preferred type in the amount of 0.90 grams except that it contained 35% by weight of water and 1.5% by weight of sodium chloride. The impregnated activated carbon was of 20×50 mesh and consisted of 0.57 grams of activated carbon and 0.31 grams of water and 0.014 grams of sodium chloride. Thus, the water consisted of 35% of the total weight of the impregnated activated carbon. The total weight of the mixture of iron activated carbon, salt and water was 1.24 grams. The mixture was placed in a TYVEK envelope, Grade 1059B, and the envelope containing the mixture was placed in a 500 cc jar containing 25 grams of dry prepared breakfast cereal, LUCKY CHARMS brand, which occupied about 160 milliters of space. The jar was maintained at an ambient temperature of about 70° F. The following test results were obtained:

| Elapsed Time in Hours | Average Oxygen Absorption of Three Samples |
|---|---|
| 19 | 2.1 cc |
| 25 | 2.4 cc |
| 42 | 2.2 cc |

EXAMPLE 5

A test was made which was identical to Example 4 except that the envelopes were made of the trilaminate film described above, and the following results were obtained:

| Elapsed Time in Hours | Average Oxygen Absorption of Three Samples |
|---|---|
| 19 | 25.7 cc |
| 25 | 27.4 cc |
| 42 | 27.4 cc |

EXAMPLE 6

A test was made which was identical to Example 4 except that 0.80 grams of the above-described preferred impregnated activated carbon was used containing by weight 33% water and 1.5% sodium chloride. Thus the sample contained 0.52 grams of activated carbon, 0.26 grams of water and 0.012 grams of salt. A TYVEK envelope was used. The results were as follow:

| Elapsed Time in Hours | Average Oxygen Absorption of Three Samples |
|---|---|
| 19 | 4.0 cc |
| 25 | 4.7 cc |
| 42 | 4.7 cc |

EXAMPLE 7

A test was made which was identical to Example 6 except that the envelopes were made of trilaminate film described above, and the following results were obtained:

| Elapsed Time in Hours | Average Oxygen Absorption of Three Samples |
|---|---|
| 19 | 50.4 cc |
| 25 | 55.4 cc |
| 42 | 57.4 cc |

An analysis of Examples 4–7 reveals that the combination of impregnated activated carbon in a trilaminate envelope produces much better oxygen absorption than the combination of the same amounts of impregnated carbon in a TYVEK envelope. In this respect, a comparison of Examples 4 and 5 wherein the impregnated activated carbon had 35% water, the oxygen absorption was much greater in a trilaminate envelope. A comparison of Examples 6 and 7 shows similar results to Examples 4 and 5, namely, that the impregnated activated carbon in the trilaminate envelope absorbed an average of about 54.3 cc versus about an average of 4.5 cc for the TYVEK envelope. The differences favoring the use of impregnated activated carbon in a trilaminate envelope over a TYVEK envelope is that the trilaminate will impede the migration of water out of the envelope whereas the TYVEK does not impede this migration because it has a higher water vapor transmission rate. In the present instance the dry cereal acted as a desiccant to draw the moisture out of the TYVEK envelope at a more rapid rate than from the trilaminate, that is, before the moisture can work with the salt to produce sufficient electrolyte for activating the iron. Stated otherwise, the trilaminate, by impeding the passage of moisture without impreding the passage of oxygen permits the activated carbon to release its moisture to the salt to create the electrolyte to activate the iron to combine with and thus absorb the oxygen.

The following tests set forth in Examples 8–15 were also made to show that silica gel in a trilaminate envelope does not work as effectively as impregnated activated carbon in a trilaminate envelope even if it possesses the same total amount of water as impregnated activated carbon. In these examples the silica gel only contained 21% by weight of water, which is substantially the maximum amount it can have and still remain flowable. In these tests, while the silica gel had only 21% water as compared to the 35% water of the activated carbon, the amount of silica gel was increased so that the total amount of water in the silica gel was equal to the total amount of water in the impregnated activated carbon.

EXAMPLE 8

A composition was prepared by blending 0.33 grams of 100 mesh annealed electrolytically reduced iron with 0.01 grams of 325 mesh sodium chloride to provide a total weight of 0.34 grams with the sodium chloride comprising 2% of the weight of the iron. Water-impregnated activated carbon of the above-described preferred type except as noted hereafter in the amount of 0.61 grams was blended with the mixture of iron and sodium chloride. The impregnated activated carbon was of 30×80 mesh and consisted of 0.40 grams of activated carbon and 0.21 grams of water. Thus, the water consisted of 35% of the total weight of the impregnated activated carbon. The total weight of the mixture of iron activated carbon, salt and water was 0.95 grams. The mixture was placed in a trilaminate envelope, and the envelope containing the mixture was placed in a 500 cc jar containing air. The jar was maintained at an ambient temperature of about 70° F. The following test results were obtained:

| Elapsed Time in Hours | Average Oxygen Absorption of Three Samples |
|---|---|
| 17 | 13 cc |
| 24 | 16 cc |
| 41 | 31 cc |

EXAMPLE 9

Tests were performed which were identical to Example 8 except that 1.00 grams of silica gel containing 21% by weight of water was substituted for the 0.61 grams of impregnated activated carbon containing 35% by weight of water so that the total water contents of the silica gel and the activated carbon were equal, and the following results were obtained:

| Elapsed Time in Hours | Average Oxygen Absorption of Three Samples |
|---|---|
| 19 | 0 |
| 25 | 0 |
| 42 | 0 |

EXAMPLE 10

Tests were performed which were identical to Example 8 except that 0.61 grams of impregnated activated carbon of the above preferred type was used except that it contained 28% by weight of water, i.e., 0.17 grams of water, and the following results were obtained:

| Elapsed Time in Hours | Average Oxygen Absorption of Three Samples |
|---|---|
| 17 | 16 cc |
| 24 | 22 cc |
| 41 | 29 cc |

EXAMPLE 11

Tests were performed which were identical to Example 10 except that 0.81 grams of silica gel containing 21% by weight of water was substituted for the activated carbon, i.e., 0.17 grams of water and the following results were obtained:

| Elapsed Time in Hours | Average Oxygen Absorption of Three Samples |
|---|---|
| 19 | 0 cc |
| 25 | 0 cc |
| 42 | 0 cc |

EXAMPLE 12

Tests were performed which were identical to Example 8 except that 0.90 grams of 20×50 mesh of the above-described preferred impregnated activated carbon containing 33% by weight of water and containing 1.5% by weight of NaCl was used, and the 0.34 grams of iron did not have NaCl added thereto. Thus this composition contained 0.31 grams of water. The following results were obtained:

| Elapsed Time in Hours | Average Oxygen Absorption of Three Samples |
| --- | --- |
| 24 | 31 cc |
| 44 | 41 cc |
| 89 | 51 cc |

EXAMPLE 13

Tests were performed which were identical to Example 12 except that 1.5 grams of silica gel containing 21% water plus 1.5% sodium chloride was substituted for the activated carbon. Thus the water content was 0.31 grams. The following results were obtained:

| Elapsed Time in Hours | Average Oxygen Absorption of Three Samples |
| --- | --- |
| 19 | 0 cc |
| 25 | 0 cc |
| 42 | 0 cc |

EXAMPLE 14

Tests were performed which were identical to Example 8 except that 0.80 grams of 20×50 mesh of the above-described preferred impregnated activated carbon was used which contained by weight 33% water plus 1.5% NaCl. This amounted to 0.26 grams of water. The following results were obtained:

| Elapsed Time in Hours | Average Oxygen Absorption of Three Samples |
| --- | --- |
| 24 | 67 cc |
| 44 | 79 cc |
| 89 | 90 cc |

EXAMPLE 15

Tests were performed which were identical to Example 14 except it substituted for the activated carbon 1.25 grams of silica gel containing by weight 21% water and 1.5% NaCl. This amounted to 0.26 grams of water. The following results were obtained:

| Elapsed Time in Hours | Average Oxygen Absorption of Three Samples |
| --- | --- |
| 19 | 0 cc |
| 25 | 0 cc |
| 42 | 0 cc |

A comparison of Examples 8 and 9; 10 and 11; 12 and 13; and 14 and 15 shows that even when flowable silica gel having 21% of water is used in sufficient amounts to provide total amounts of water which are equal to the total amounts of water contained in moisture-impregnated activated carbon, the oxygen absorption produced by the impregnated activated carbon greatly exceeds the oxygen absorption of the silica gel. In fact, as can be seen from Examples 9, 11, 13 and 15, there was no oxygen absorption in a dry environment by the silica gel because it does not give up its water to produce the necessary electrolyte, whereas in Examples 8, 10, 12 and 14 the activated carbon does give up its water for combining with the salt to form an electrolyte.

Summarizing, the moisture-impregnated activated carbon containing a relatively large amount of water is flowable, and it readily gives up this water in dry environments. Additionally, when such impregnated activated carbon is used in the above-described trilaminate envelope, the latter impedes the migration of water out of the envelope, and thus conserves it for combining with the salt of an oxygen-absorbing composition. On the other hand, the silica gel is preferred for use in moist environments because of its great water-attracting capacity, and, further, the TYVEK is preferable in a moist atmosphere because it has a greater water vapor transmission rate than the trilaminate.

Generally the finer the particulate iron which is used, the speedier will be the oxygen absorption. Thus, 325 mesh iron and above is preferred from a theoretical viewpoint. However, the fineness may be limited by the use of the machinery which is utilized to fabricate the packets or labels discussed above.

While preferred embodiments of the present invention have been disclosed, it will be appreciated that the present invention is not limited thereto but may be otherwise embodied within the scope of the following claims.

What is claimed is:

1. A packet for absorbing oxygen comprising an oxygen-absorbing composition including in relatively sufficient proportions particulate annealed electrolytically reduced iron, salt for combining with water to produce an electrolyte which combines with said iron to cause it to absorb oxygen, and an envelope enclosing said composition which inhibits migration of water from said envelope.

2. A packet for absorbing oxygen comprising an oxygen-absorbing composition including in relatively sufficient proportions particulate annealed electrolytically reduced iron, salt for combining with water to produce an electrolyte which combines with said iron to cause it to absorb oxygen, and a moisture and oxygen permeable envelope containing said composition and which permits oxygen to pass therethrough but resists the migration of water therefrom.

3. A packet for absorbing oxygen comprising an oxygen-absorbing composition including in relatively sufficient proportions particulate annealed electrolytically reduced iron, salt for combining with water to produce an electrolyte which combines with said iron to cause it to absorb oxygen, and an envelope containing said composition which permits oxygen to pass therethrough while tending to retain water therein.

4. A packet as set forth in claim 1 wherein said oxygen-absorbing composition includes activated carbon with liquid water therein for supplying said water to said salt to produce said electrolyte.

5. A packet as set forth in claim 4 wherein said water-supplying component is present by weight in an amount of up to about 85% of the total weight of the oxygen-absorbing composition.

6. A packet as set forth in claim 5 wherein said water-supplying component contains by weight up to about 40% of water.

7. A packet as set forth in claim 2 wherein said oxygen-absorbing composition includes activated carbon with liquid water therein for supplying said water to said salt to produce said electrolyte.

8. A packet as set forth in claim 7 wherein said water-supplying component is present by weight in an amount of up to about 85% of the total weight of the oxygen-absorbing composition.

9. A packet as set forth in claim 8 wherein said water-supplying component contains by weight up to about 40% of water.

10. A packet as set forth in claim 3 wherein said oxygen-absorbing composition includes activated carbon with liquid water therein for supplying said water to said salt to produce said electrolyte.

11. A packet as set forth in claim 10 wherein said water-supplying component is present by weight in an amount of up to about 85% of the total weight of the oxygen-absorbing composition.

12. A packet as set forth in claim 11 wherein said water-supplying component contains by weight up to about 40% of water.

* * * * *